(12) United States Patent
Whaley et al.

(10) Patent No.: US 11,482,905 B2
(45) Date of Patent: Oct. 25, 2022

(54) STATOR HAVING HOUSING-INTEGRATED BUS BARS AND INTERNAL COOLING JACKET

(71) Applicant: HIGHLANDS POWER INC., Sacramento, CA (US)

(72) Inventors: Conner Whaley, Sacramento, CA (US); Sean Fountain, Sacramento, CA (US)

(73) Assignee: Highlands Power, Inc., Sacramento, CA (US)

( * ) Notice: Subject to any disclaimer, the term of this patent is extended or adjusted under 35 U.S.C. 154(b) by 227 days.

(21) Appl. No.: 16/058,962

(22) Filed: Aug. 8, 2018

(65) Prior Publication Data

US 2019/0165634 A1    May 30, 2019

Related U.S. Application Data

(60) Provisional application No. 62/591,559, filed on Nov. 28, 2017.

(51) Int. Cl.
| | |
|---|---|
| H02K 9/19 | (2006.01) |
| H02K 3/50 | (2006.01) |
| H02K 5/20 | (2006.01) |
| H02K 15/00 | (2006.01) |
| H02K 15/14 | (2006.01) |
| H02K 3/52 | (2006.01) |
| H02K 3/24 | (2006.01) |
| H02K 1/18 | (2006.01) |
| H02K 5/04 | (2006.01) |

(52) U.S. Cl.
CPC ............... *H02K 3/50* (2013.01); *H02K 1/182* (2013.01); *H02K 3/24* (2013.01); *H02K 3/521* (2013.01); *H02K 5/04* (2013.01); *H02K 5/20* (2013.01); *H02K 15/0062* (2013.01); *H02K 15/14* (2013.01); *H02K 9/19* (2013.01); *H02K 2203/09* (2013.01)

(58) Field of Classification Search
CPC .......... H02K 3/50; H02K 15/00; H02K 15/14; H02K 5/20; H02K 9/19; H02K 3/24; H02K 3/521; H02K 5/04; H02K 1/182; H02K 15/0062; H02K 2203/09
USPC ................................... 310/52–64, 71, 89, 68
See application file for complete search history.

(56) References Cited

U.S. PATENT DOCUMENTS

| | | | |
|---|---|---|---|
| 6,528,917 B2 * | 3/2003 | Shimamoto | H02K 3/505 |
| | | | 310/270 |
| 9,030,063 B2 * | 5/2015 | Rawlinson | B60L 15/007 |
| | | | 310/52 |

(Continued)

*Primary Examiner* — Naishadh N Desai
(74) *Attorney, Agent, or Firm* — Bamert Regan PLLC (57) ABSTRACT

An axial or radial flux electric motor or generator consisting of a housing, a stator assembly(s), and rotor(s) where the stator assembly and rotor are aligned with each other while allowing an air gap between the stator and rotor, with electromagnetic forces being applied between the two when the rotor rotates within the stator. Stator coils are connected by one or more conductive bus bars integrated into the motor housing where the stator coils are affixed to the bus bars to create individual stator phases. The stator assembly is enclosed within a cooling jacket where cooling channels flow a coolant media directly over the stator coils during operation. The flow of coolant is controlled by a set of permeable dividers that direct coolant over the surface area of the coil evenly.

17 Claims, 6 Drawing Sheets

(56) References Cited

U.S. PATENT DOCUMENTS

2016/0056683 A1\* 2/2016 Nakanishi ............... H02K 5/20
                                                310/54
2017/0144693 A1\* 5/2017 Okubo ................. B62D 5/046
2018/0026493 A1\* 1/2018 Jung .................... H02K 9/005
                                                310/52

\* cited by examiner

STATOR HAVING HOUSING-INTEGRATED BUS BARS AND INTERNAL COOLING JACKET

CROSS-REFERENCE TO RELATED APPLICATION

This application claims the benefit of U.S. Provisional Patent Application Ser. No. 62/591,559, filed on Nov. 28, 2017, the entirety of the disclosure of which is hereby incorporated herein by this reference.

BACKGROUND OF THE INVENTION

1. Field of the Invention

The present invention relates generally to axial flux or radial flux electric motors and generators. More specifically, it relates to an axial flux or radial flux electric motor or generator having electrical bus bars integrated into the inner periphery of its outer housing to electrically connect stator coils.

2. Description of the Related Art

Various configurations and designs of electric motors have been increasing in demand over recent years due increased use of them in alternative energy applications where electricity is the medium of energy supply. As one example, there has also been significant growth of the electric automotive vehicle market for both commercial and private transportation. The requirements of this industry and the applications the vehicles are subjected to have spawned numerous types of stator connection methods that reduce design complexity and cost of construction of the motor while simultaneously increasing drivetrain performance.

The most common electrical connection method used in stators is a single continuous wire wound to create a phase in the electric motor. This typically consists of an insulated magnet wire wound around multiple ferrous cores spaced at repeating intervals from each other to create individual stator cores. The connection between each stator core is not broken at any step in the manufacturing or assembly process. This process is repeated to create the required number of stator phases to operate the motor. Once the phases are installed, a final layer of insulation is applied to the wire and the stator phases are complete.

While this has been a common manufacture of motors in the industry for some time, one problem that occurs is that there a lack of flexibility in the winding geometry needed that is not suitable for many stator designs. In particular, axial flux motors use winding geometries that are more difficult to manufacture with a single wire raising component costs. Conventional spool winding machines suitable for axial flux core geometries cannot wind multiple coils with thicker magnet wire, further increasing manufacturing costs. A single continuous wire also requires higher precision to ensure the proper length of wire between cores that can lead to lower production yields in low volume.

One example of the prior art is a "Busbar unit for an electric motor" by Nakaba Kataoka; 7 Apr. 2009, which describes a plurality of bus bars that have teeth extending radially from the interior of the housing to meet with the stator coils. The bus bar holder in Nakaba is molded directly to the bus bar to create a single bus bar unit.

However, Nakaba is problematic in that the method of attachment is suboptimal for traction motor applications because the use of a separate bus bar holder is an inefficient use of space and material. Additional weight and volume is also added to the motor and reduces the overall performance and market viability of the motor. Further, the placement of the Nakaba bus on the housing increases space within and outside of the motor increases the size of the motor which is disadvantageous if a certain standard size of the motor is needed due to given industry specifications.

SUMMARY OF THE INVENTION

In one embodiment, the invention includes an electric machine with one or more electric bus bars embedded in the interior of the periphery of the motor housing with individual stator coils connected directly to at least one bus bar. Each bus bar will internally protrude radially from the motor housing in the direction of the axis of rotation of the rotor at specific intervals to provide a surface with which the stator coils can connect. A single bus bar can be used for each phase with the number of bus bars added or subtracted according to the requirements of the motor design. The individual coils can be connected to the bus bar through welding, crimping, soldering, mechanical connection, chemical solvents or any other relevant means of electrically connective attachment.

In one embodiment, the individual stator coils are spool wound around a solid or laminated ferrous core independently from the remaining stator cores in the phase, and then attached to one or more bus bars. Furthermore, the stator coils can be wound with additional insulating material inserted between the wire and the core material.

In one embodiment, the bus bars and stator the bus bars can be cooled with the machine having an internal cooling jacket consisting of a housing enclosing the stator to allow coolant to come into direct contact with a plurality of stator coils and exposed bus bars. Each stator coil is placed in an individual "cell" located peripherally along the outer edge of the housing. The walls of each cell are permeable to allow coolant to flow from one cell to another with the cells being connected in series or in parallel depending on achievable coolant flow rate or allowable pressure drop.

In one embodiment, the bus bars are embedded in a composite motor housing through an overmoulding process. Bus bars are then placed into an injection mold used for the motor housing and composite material is injected into the mold and adhered to the surface of the bus bar. The housing is then removed from the mold with the bus bars embedded therewithin. Additional embedding techniques such as a press fit, snap fit, adhesion, chemical solvents or mechanical attachments are also suitable.

The present invention is thus able to provide embedded bus bars as the electrical connection between all stator coils of an electric motor or generator that produces electricity or motivates circular motion of a shaft.

Embedding bus bars in the motor housing while connecting individually wound stator coils improves the cost, manufacturability, power, torque, efficiency and/or material usage within an electric machine. Performance gains in any of these categories can provide a significant advantage in industries such as electric vehicles and renewable power generation.

DETAILED DESCRIPTION OF THE INVENTION

Figure 1:
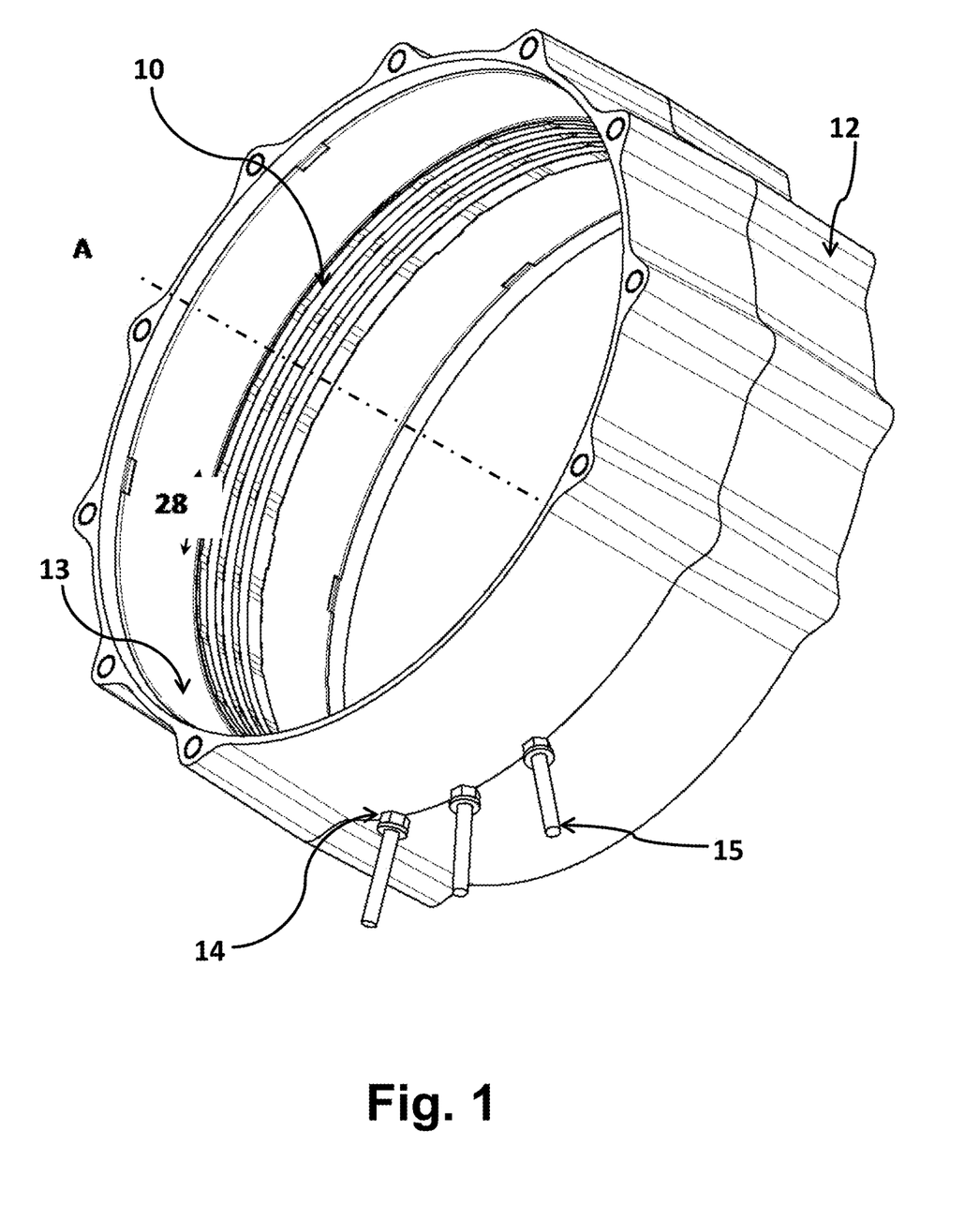
FIG. 1 is a perspective view of an outer housing of an electrical machine with one embodiment of embedded bus bars within the interior of the outer housing.

Referring now to the drawings in which like numerals represent like elements throughout the several view, FIG. 1 depicts one embodiment of the embedded bus bars 10 within the motor housing 12. The motor housing 10 configured to house a rotor that rotates about an axis of rotation therewithin, shown here as Axis A.

Figure 5:
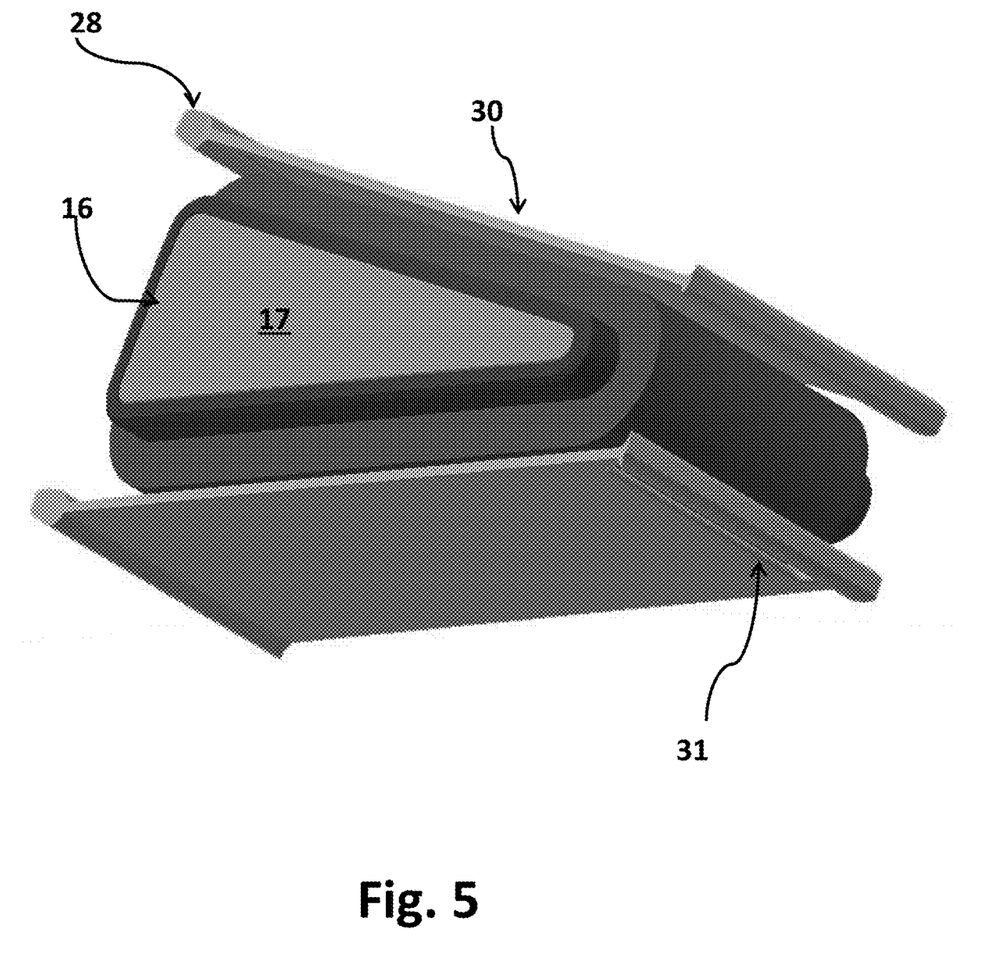
FIG. 5 is a perspective view of one embodiment of a stator coil between permeable dividers that allow coolant to flow around the stator coil.

Here, there is a plurality of electrically conductive bus bars 10 running along the inner surface of the interior periphery 13 of the machine's housing 12, with electrically connective entry and exit holes 14 for the bus bars 10 and connection terminals 15 to make an electrical connection with a power source. A portion of the bus bar 10 remains exposed and accessible to the internal volume of the motor housing 12 to act as an electrical connection point for the stator coils 16 (FIG. 5). A plurality of stator coils 6 are lowered into the machine housing 12 and held in place prior to assembly. The leads of each individual stator coils 16 are electrically and mechanically joined to the exposed face of a single bus bar 10 according to the required phase order of the machine being constructed. The bus bars 10 are then connected to the connection terminals 15 to complete the electric circuit.

In one embodiment, the housing 12 is made from a semi-conductive or non-conductive/insulating material. A preferred material is carbon fiber or carbon fiber reinforced composite. However, other plastics, polymer-composites, or other metallo-ceramic composites and alloys are suitable. It is preferable that the housing 12 also be nonmagnetic due to the strong operational electromagnetic forces being generated in the motor/generator which is possible because of the coolant keeping the stator coils 16 cool.

Furthermore, in the embodiment of the invention shown in FIG. 1, each bus bar 10 is responsible for the connection of a single stator phase consisting of a plurality of stator coils 16. Electricity flows from the connection terminal 15 into a single bus bar 10 and energizes the bus bar 10. The connected stator coils 16 become simultaneously energized and create a magnetic field equivalent to an electric machine with stator coils with a direct wired connection.

Further, in the embodiment of the invention shown in FIG. 1, each bus bar 10 is preferably coated in an electrically insulative enamel to prevent the bus bars 10 from shorting to a potentially conductive housing 12. The enamel coating is removed from the stator coil 16 phase terminals prior to assembly to ensure a good electrical contact between the stator coil 16 and bus bar 10. While a circular bus bar 16 is shown, oblong, square, rectangular, irregular, trapezoidal or other bus bar 10 profiles can be considered part of the embodiment of the invention. While a triangularly shaped stator coil 16 is shown, oblong, square, rectangular, irregular, trapezoidal or other stator coil 16 profiles can be considered part of the embodiment of the invention.

In the embodiment of the invention shown in FIG. 1, stator coils 16 are connected solely to the bus bar 10 and have no direct wired connection from coil to coil. Stator coils 16 can be wound with wiring in the common fashion in a clockwise or counter-clockwise direction to create either a north or south pole.

Stator coils 16 can be attached to the bus bar through multiple attachment means including welds, solder, mechanical fasteners, electrically conductive adhesive, snap fits or any other suitable, electrically conductive attachment method. Bus bars 10 can be attached to the motor housing 12 through multiple attachment means including welds, overmould, solder, mechanical fasteners, electrically conductive adhesive, snap fits or any other suitable attachment method.

In one embodiment of the invention, stator coils 16 can be manufactured from a single wire length, then divided into individual coils for connection to the bus bar. To manufacture a stator coil 16, the stator cores 17 are placed onto a hand operated or motorized spindle and held in place through pressure from a mechanical fastener. The wire is pre-tensioned to a specific value determined by the gauge of wire and core geometry and the spindle is turned and the wire is fed onto the core according to a predetermined lay pattern. Once the stator coil 16 has been wound to the predetermined number layers, turns and wire layout, the stator coil 16 is either cut and removed from the spool winder, or the spool winder continues to wind the next stator coil 16 in the series.

A potential embodiment of the invention is to wrap the stator wire around the core with a significant physical gap between loops to allow coolant to flow directly onto a lower coil layer. Many iterations of an electric machine will require multi-layer stator coils 16 and will prevent coolant from extracting heat generated by the bottom layer or stator core 17 efficiently. To overcome this, each stator coil 16 is wrapped around the stator core 17 using a lower level of pretension to lower the copper packing factor of the stator coils. Spacers are added between the stator coils 16 to prevent the wires from migrating towards each other while still allowing coolant to flow. Less space is taken up by the copper wire and increases the surface area of the core sleeve and copper wire interacting with the coolant media.

In one embodiment of the invention, the stator core 17 is insulated from the wire coil through a thermally conductive, electrically insulative core sleeve. This core sleeve can be molded, pressed, shrunk fit, coated or snapped onto each individual core to prevent the wire coils from creating a short circuit with the stator core 17 material.

The core sleeve material will have a similar, if not equal, thermal expansion coefficient as the stator core 17 and the cooling jacket to prevent additional stress on any joints during operation at high temperatures.

In one embodiment of the invention, the material of the stator core 17 is itself electrically insulative and prevents a short circuit with the stator coil 16.

Figure 2:
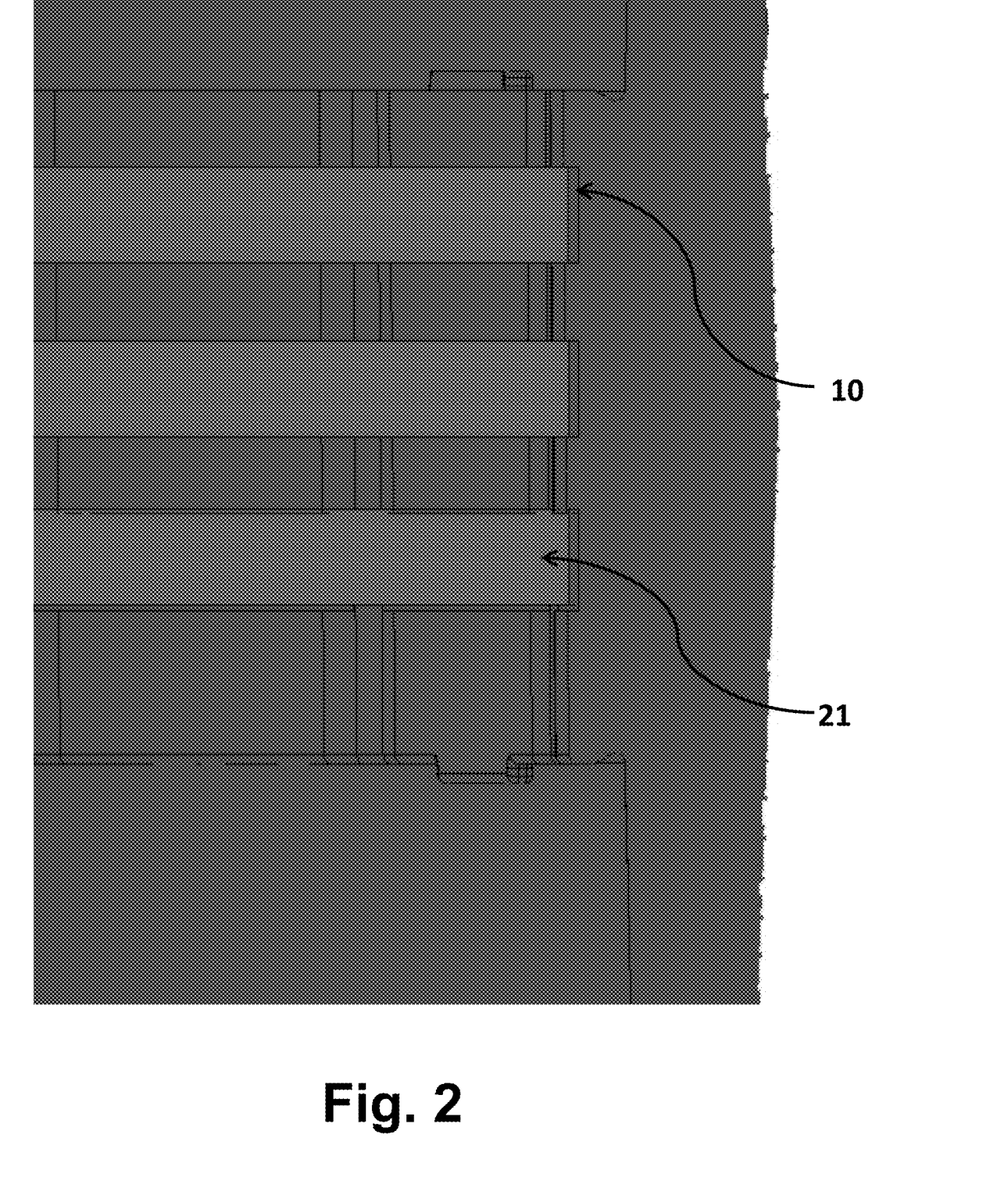
FIG. 2 is a cross-section of the embedded bus bars within the machine's outer housing.

FIG. 2 presents a cross sectional view of the integrated bus bars 10 within the housing 12. The bus bars are shown to be a recessed copper strip 20 within the motor housing 12 itself and does not protrude into the motor housing's 12 interior volume. This increases the maximum radius of the magnetic airgap, increasing the motor's gravimetric and volumetric torque density.

With the copper strip 20 recessed, at least 20% of the bus bar's total surface area 21 is exposed to the motor's internal volume. In one embodiment of the invention, the exposed surface area 21 of the bus bar is cooled through direct contact with liquid coolant to prevent overheating. Other embodiments can include cooling media such as air, ethylene glycol, water, refrigerants, or passive cooling through the housing 12 acting as a heatsink.

Each bus bar 10 radially protrudes internally from the interior surface 13 of the periphery of the motor housing 12 perpendicular to the direction of the Axis A of rotation of the rotor. Further, each electric bus bar 10 is affixed within the interior surface 13 of the periphery of the motor housing 12 at predetermined intervals 28 thereby providing a surface with which each stator coil 16 can electrically connect to at least one bus bar 10 in a radial manner about the Axis A of rotation for the rotor.

Figure 3:
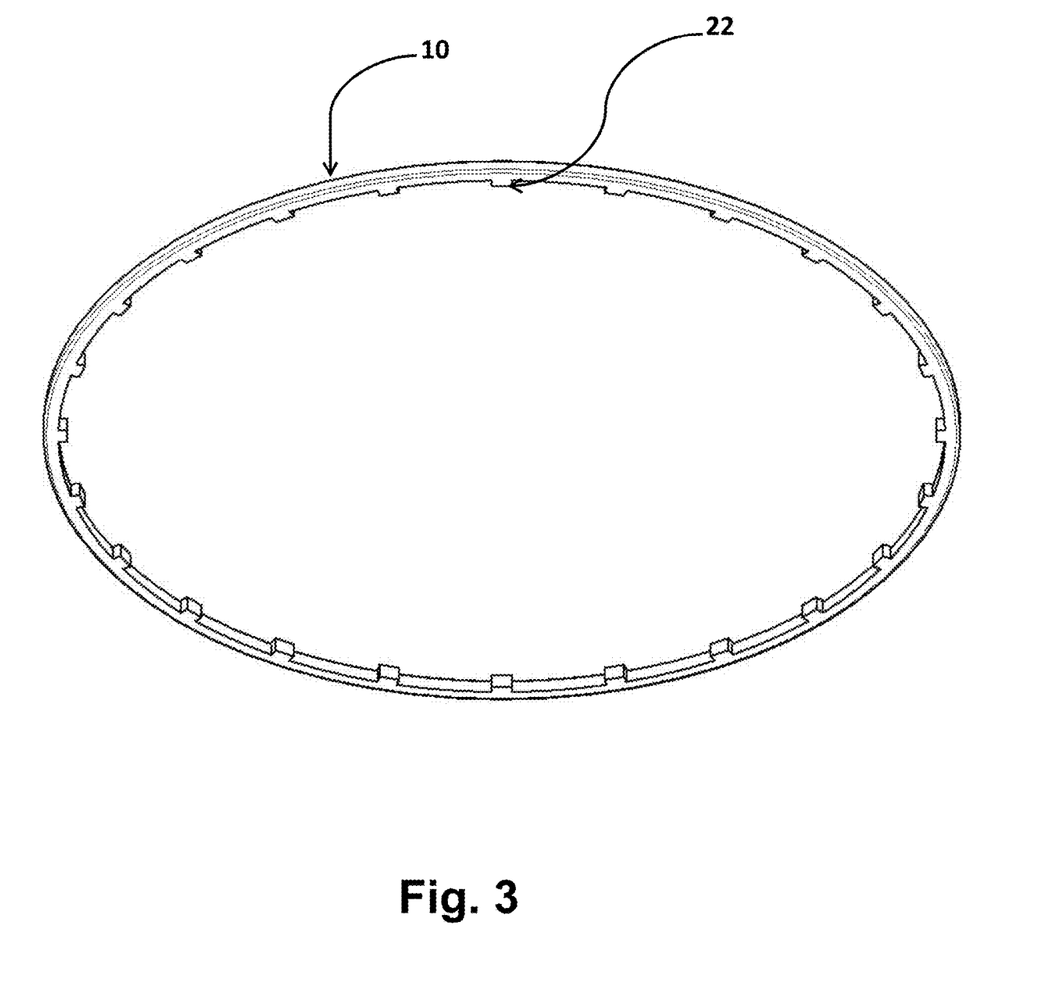
FIG. 3 is a perspective view of one embodiment of an individual bus bar.

FIG. 3 shows one embodiment of an individual bus bar 10 cast a single-piece ring. Individual bus bars 10 may be manufactured through multiple processes including casting, forging, extrusion, manual or automated bar bending, machining or sand casting. The decision to use a particular manufacturing method is dependent on the performance requirements of the bus bar 10 material selection and required production volumes.

In order to effectively connect the bus bars 10 with the stator coils 16 sharp bends 22 in the bus bar 10 may be necessary. The point of connection between the stator coil 16 and the bus bar 10 is determined by the connection method being used. Most welding techniques will require the connection point to be easily accessible and may require the connection point to be moved closer to either axial face of the stator core 17. If the connection between the stator coil 16 and the bus bar 10 is made before the bus bars 10 are installed into the motor's outer housing 12, the connection point may be placed in areas less accessible once the stator is fully assembled.

Material selection plays a critical role in the performance and cost effectiveness of the bus bar 10. In the preferred embodiment of the invention aluminum and copper are preferred materials, but any thermally and electrically conductive material may be substituted to satisfy an application requirement.

Bus bar 10 size and shape are dependent on the specific geometry of an individual motor. High pole count, high performance motors will generally require more complex bus bar 10 designs to accommodate larger numbers of connections and higher current densities within the stator. Lower pole count motors will generally require less complex bus bar 10 designs.

Figure 4:
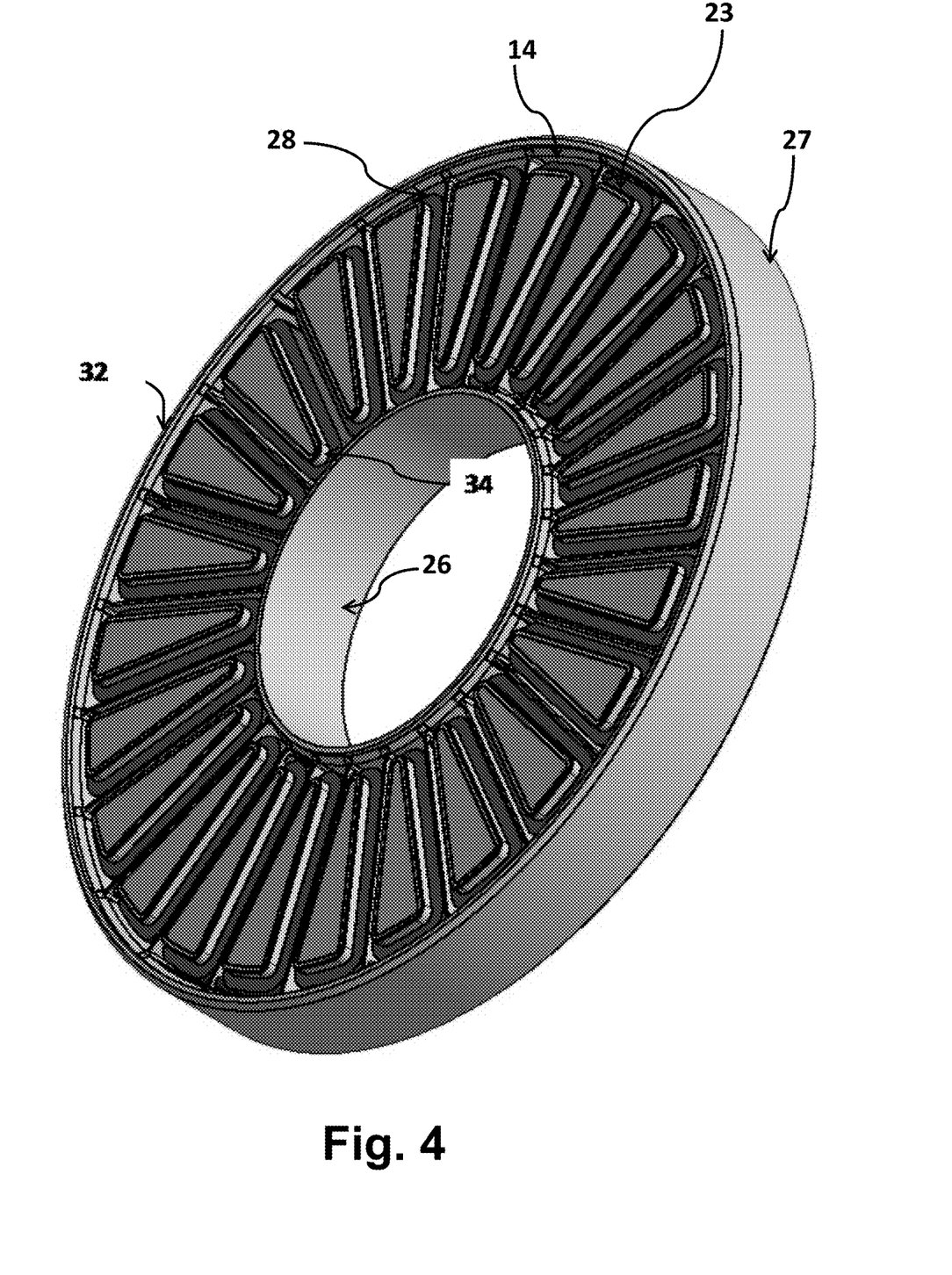
FIG. 4 is a perspective view of one embodiment of the internal cooling jacket that fits within the outer housing.

FIG. 4 depicts a potential embodiment of the stator coils 16 and integrated bus bars 10 within an internal cooling jacket 23. The jacket 23 consists of two concentric rings 26, 27 connected by a plurality of permeable dividers 28 (FIG. 5) and two stator face plates 29. The plurality of permeable dividers 28 extend radially from the outer face of the inner ring 26 to join to the inner face of the outer ring 27. The two stator face plates 29 are then placed on the axial faces 32,34 of the concentric rings 26, 27 to create the structure of the integrated cooling jacket 23. The exposed face of the bus bar 10 are cooled within the integrated cooling jacket 23.

In the embodiment of the invention shown in FIG. 5, the permeable dividers 28 serve to divide the annular space between the concentric rings into individual cells 30. The number of cells 30 created by the permeable dividers 28 is equal to the number of discrete stator coils 16 intended for the electric machine. Each stator coil 16 is held between two permeable dividers 28 to provide easy alignment relative to the rotor position as well as to improve assembly time. The dividers 28 are permeable to allow coolant to flow from one cell 30 to another in either a series or parallel circuit. The coolant comes into direct contact with the stator coils 16 to minimize thermal barriers and improve performance.

The cells 30 are oversized relative to the stator coil 16 to allow coolant to flow around the circumference of the coil 16. Coolant circulates evenly around the active coil area and the end turns to ensure even heat extraction. Coolant can flow from one cell 30 to another in a series or parallel circuit according to the allowable pressure drop within the cooling jacket 23. The channels surrounding the stator coil 16 can have a predetermined size to accommodate the flow rate, pressure, cooling jacket material, and cooling medium.

Coolant is guided in a serpentine pattern around the stator coil 16 and bus bars 10. This is achieved by alternating the placement of the guiding holes 31 on the permeable divider 28 close to the inner diameter of the outer concentric ring 27 to the outer diameter of the inner concentric ring 26. Coolant enters and exits in opposing corners of the cell 30 in either a parallel or series circuit.

Figure 6:
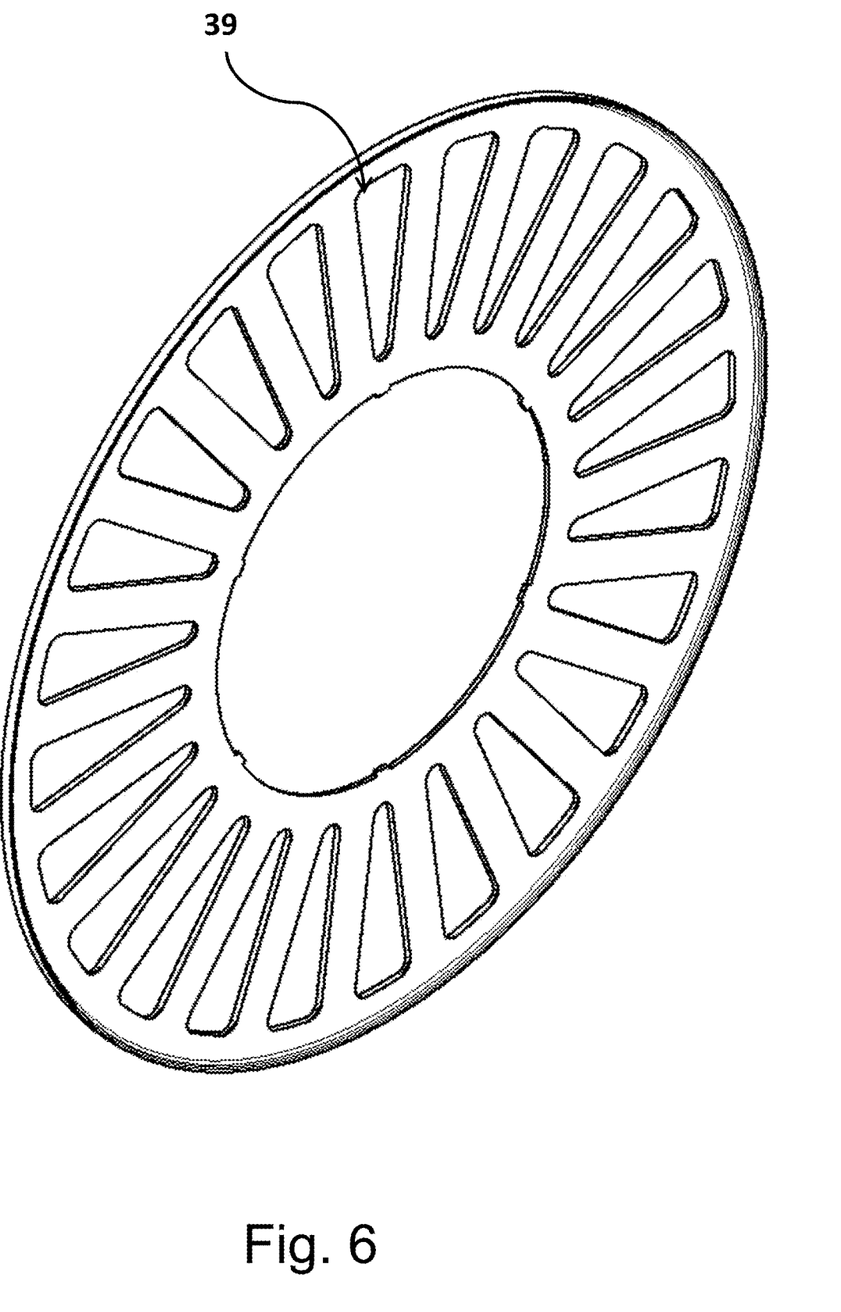
FIG. 6 is a perspective view of one embodiment of a stator plate.

As shown in FIG. 6, during assembly, a stator plate 39 is attached to the motor housing 12 prior to inserting the stator coil 16 into the cell 30. As the stator coil 16 is lowered into the cell 30, the stator core 17 aligns with the hole in the stator plate 39 and is properly seated when the core sleeve comes into contact with the stator plate 39. The stator plate uses either a small ledge, fillet, or some other physical alignment feature on the stator core 17 to endure the stator face plate is properly registered. The opposing stator plate 39 is then lowered onto the opposing side of the stator core 17 to create a fully assembled cooling jacket 23.

The stator plates 39 can be permanently attached and sealed to the cooling jacket 23 through ultrasonic welding, chemical solvents, adhesive or mechanical attachment means. The appropriate bonding process can take place on a fully or partially assembled stator according to the properties of the machine being manufactured.

The cooling jacket 23 may be made out of high temperature plastic, fiberglass, carbon fiber, or any non-magnetic material suitable in the operating temperature and load requirements of the electric machine.

Mechanical connectors and O-rings can be used to create a tight, waterproof seam on every interface in the cooling jacket 23. Stator cores 17 may consist of insulated steel laminations stacked to reduce eddy current losses and leaves a raw edge that is not suitable for tight bonding. Additional mechanical connectors and O-rings are installed at every connection interface to ensure a strong connection between all components.

A potential embodiment of the invention is to use cantered coil springs as the mechanical connector between the stator core 16 and stator face plates 20. A cantered coil spring can provide higher holding forces within a small axial component interface, making it suitable for motors with short axial lengths. The spring can connect directly to the face of the stator face plates 39 and the stator core 17 and does not need to be attached to the core sleeve 19. If suitable, O-rings can be molding onto the springs directly to further minimize the axial space requirements of the connection. Holding forces can also be changed using different canted spring angles, widths and wire gauge to suit motors across a large power range.

Concentric rings may contain some form of shielding to mitigate any electromagnetic interference, or EMI, generated by the electric machine. This EMI shielding can be wrapped around the concentric rings 26, 27 or embedded during the manufacturing process. Should the housing 12 be integrated with the cooling jacket 23, EMI shieling can be embedded in the motor housing 12 in lieu of shielding the concentric rings 26,27.

What is claimed is:

1. An electric machine, comprising:
   a motor housing having a periphery thereof and an interior surface of the periphery, the motor housing configured to house a rotor that rotates about an axis of rotation therewithin;
   one or more electric bus bars embedded in the motor housing, each bus bar radially protruding internally from the interior surface of the periphery of the motor housing in a direction of the axis of rotation of the rotor; and
   at least one stator coil directly connected to at least one of the one or more electric bus bars,
   wherein each of the one or more electric bus bars is affixed within the motor housing at predetermined intervals thereby providing at least one surface configured to electrically connect with the at least one stator coil in a radial manner about the axis of rotation for the rotor,
   wherein the motor housing further includes an internal cooling jacket comprising a coolant housing enclosing the at least one stator coil, the coolant housing configured to allow coolant to directly contact the at least one stator coil and at least one of the one or more electric bus bars.

2. The electric machine of claim 1, wherein the at least one stator coil is connected to at least one of the one or more electric bus bars by welding.

3. The electric machine of claim 1, wherein the at least one stator coil is connected to at least one of the one or more electric bus bars by crimping.

4. The electric machine of claim 1, wherein the at least one stator coil is comprised of a conductive spool of wire wound around a ferrous core.

5. The electric machine of claim 4, wherein the at least one stator coil includes an insulating layer between the conductive spool of wire and the ferrous core.

6. The electric machine of claim 1, wherein one or more of the at least one stator coil are mechanically positioned and supported by the coolant housing along a perimeter of the motor housing.

7. The electric machine of claim 1, further comprising a plurality of coolant housings, and wherein each of the coolant housings further includes one or more permeable walls that are configured to allow coolant to flow between coolant housings.

8. The electric machine of claim 6, wherein the one or more permeable walls are configured to allow coolant to flow between the coolant housings at a predetermined flow rate.

9. The electric machine of claim 7, where the at least one stator coil includes two axial faces and one or both of the axial faces extend beyond the coolant housings to provide a magnetic airgap between the rotor and one or both of the two axial faces of the at least one stator coil.

10. The electric machine of claim 1, wherein the electric machine is a generator.

11. The electric machine of claim 1, wherein the electric machine is a motor.

12. An electric machine, comprising:
    a motor housing having a periphery thereof and an interior surface of the periphery, the motor housing configured to house a rotor that rotates about an axis of rotation therewithin;
    at least one stator means for conducting an electric current and generating a magnetic field; and
    electrically conductive means for conducting an electric current to the at least one stator means, the electrically conductive means embedded in the motor housing, the electrically conductive means further radially protruding internally from the interior surface of the periphery of the motor housing perpendicular to the axis of rotation of the rotor;
    wherein the at least one stator means is directly connected to the electrically conductive means,
    wherein the electrically conductive means further for providing at least one surface configured to electrically connect with the at least one stator means in a radial manner about the axis of rotation for the rotor,
    wherein the motor housing further includes an internal cooling means for cooling the at least one stator means, the cooling means further configured to allow coolant to directly contact the at least one stator means and the electrically conductive means.

13. The electric machine of claim 12, wherein the at least one stator means is connected to the electrically conductive means by a mechanical means of attachment.

14. A method of manufacturing an electric machine, comprising:
    forming a motor housing having a periphery thereof and an interior surface of the periphery, the motor housing configured to house a rotor that rotates about an axis of rotation therewithin;
    embedding one or more electric bus bars in the interior of the periphery of the motor housing, each of the one or more electric bus bars radially protruding internally from the periphery of the motor housing in a direction of the axis of rotation of the rotor, wherein the embedding of each of the one or more electric bus bars provides at least one surface configured to electrically connect with at least one stator coil in a radial manner about the axis of rotation for the rotor;
    connecting the at least one stator coil directly to at least one of the one or more electric bus bars; and
    forming an internal cooling jacket within the motor housing that includes a coolant housing enclosing the at least one stator coil, the forming of the coolant housing further configured to allow coolant to directly contact the at least one stator coil and at least one of the one or more electric bus bars.

15. The method of claim 14, wherein manufacturing an electric machine includes manufacturing a generator.

16. The method of claim 14, wherein manufacturing an electric machine includes manufacturing a motor.

17. The method of claim 14, wherein embedding the one or more electric bus bars in the motor housing includes placing the one or more electric bus bars into an injection mold configured to create the motor housing, forming the motor housing includes injecting composite material into the mold so that the composite material adheres to portions of the one or more electric bus bars, and forming the motor housing further includes removing the motor housing from the mold with the bus bars embedded therewithin.

* * * * *